United States Patent
Gerard et al.

(10) Patent No.: US 7,424,149 B2
(45) Date of Patent: Sep. 9, 2008

(54) ADAPTATION OF POTENTIAL TERMS IN REAL-TIME OPTIMAL PATH EXTRACTION

(75) Inventors: Olivier Gerard, Viroflay (FR); Myriam Greff, Domene (FR); Thomas Deschamps, Boulogne Billancourt (FR)

(73) Assignee: Koninklijkle Philips Electronics N.V., Eindhoven (NL)

( * ) Notice: Subject to any disclaimer, the term of this patent is extended or adjusted under 35 U.S.C. 154(b) by 901 days.

(21) Appl. No.: 10/480,659

(22) PCT Filed: Jun. 26, 2002

(86) PCT No.: PCT/IB02/02593

§ 371 (c)(1),
(2), (4) Date: Dec. 12, 2003

(87) PCT Pub. No.: WO03/001451

PCT Pub. Date: Jan. 3, 2003

(65) Prior Publication Data

US 2004/0170320 A1    Sep. 2, 2004

(30) Foreign Application Priority Data

Jun. 26, 2001    (EP)   ................... 01401696

(51) Int. Cl.
    *G06K 9/00*     (2006.01)
    *G06K 9/34*     (2006.01)
(52) U.S. Cl. ................... 382/173; 382/171
(58) Field of Classification Search ............. 382/173
See application file for complete search history.

(56) References Cited

U.S. PATENT DOCUMENTS

| | | | | |
|---|---|---|---|---|
| 5,995,115 A * | 11/1999 | Dickie | ............ | 345/441 |
| 6,025,850 A * | 2/2000 | Gupta | ............ | 345/442 |
| 6,337,925 B1 * | 1/2002 | Cohen et al. | ............ | 382/199 |
| 6,606,091 B2 * | 8/2003 | Liang et al. | ............ | 345/424 |
| 6,621,924 B1 * | 9/2003 | Ogino et al. | ............ | 382/165 |
| 6,728,407 B1 * | 4/2004 | Horiuchi et al. | ............ | 382/199 |
| 6,741,755 B1 * | 5/2004 | Blake et al. | ............ | 382/284 |
| 6,778,698 B1 * | 8/2004 | Prakash et al. | ............ | 382/164 |
| 6,839,463 B1 * | 1/2005 | Blake et al. | ............ | 382/173 |
| 6,937,760 B2 * | 8/2005 | Schoepflin et al. | ............ | 382/173 |

OTHER PUBLICATIONS

W.A. Barrett and E.N. Mortensen, "Interactive Segmentation with Intelligent Scissors", graphical Models and Image Processing 60, pp. 349-384, 1998.

* cited by examiner

*Primary Examiner*—Bhavesh Mehta
*Assistant Examiner*—Yuzhen Ge

(57) ABSTRACT

The invention relates to a method for segmenting an image [IM] by path extraction using minimization of at least a potential [POT], said potential being calculated [CAS] from a feature [FEA] of the image [IM] using a cost assignment function [CAF], said calculation [CAS] being realized using the definition of two groups of points [NP and PP] in a neighborhood of a drawn [DRW] contour: the ones that are considered to be relevant to a boundary, called positive points [PP] and the ones that are not considered to be relevant to said boundary, called negative points [NP]. A refined characterization of positive points is constructed by combining characterizations of positive and negative points and the cost assignment function [CAF] is modified [CAL] using this refined characterization. The invention proposes also a fully automatic simultaneous adaptation of the different cost assignment functions of the individual potentials in a total function of potentials, and their relative weightings.

6 Claims, 4 Drawing Sheets

ADAPTATION OF POTENTIAL TERMS IN REAL-TIME OPTIMAL PATH EXTRACTION

FIELD OF THE INVENTION

The invention relates to a method for segmenting an image by path extraction using minimization of at least a potential, said potential being calculated from a feature of the image using cost assignment function. Said method uses a drawn contour to modify the cost assignment function.

BACKGROUND OF THE INVENTION

Such a method is known from W. A. Barrett and E. N. Mortensen, *Interactive Segmentation with Intelligent Scissors*, Graphical Models and Image Processing 60, pp 349-384, 1998. Assuming that a contour, valid in comparison with a real imaged boundary, is drawn, a function of potentials is modified in order to favor contours with a same aspect as the validated drawn contour. This modification is realized by a modification of the cost assignment function. The more a specific value of a feature is considered as relevant for a boundary, the more the cost has to be low. The idea of aspect is symbolized by a characterization of points present on the last segment of the path (segment called training path). The function of potentials is initialized and, during the extraction by minimization of the function, this initial global characterization is iteratively modified using characterizations of points on the assumed valid drawn contour.

In existing methods the characterization of points is defined for points that are on an assumed valid drawn contour. Consequently, such an extraction of path lacks robustness as points belonging to a boundary can be of various aspects along the drawn path.

SUMMARY OF THE INVENTION

It is an object of the present invention to propose an improved method for segmenting an image by path extraction using minimization of at least a potential, said method using a drawn contour to modify the potential or a function of potentials. Said improved method offers a more robust derived function of potentials.

The method according to the invention comprises the steps of:
  initializing the cost assignment function,
  defining two groups of points in a neighborhood of a drawn contour: the ones that are considered to be relevant to a boundary, called positive points and the ones that are not considered to be relevant to said boundary, called negative points,
  defining a characterization of positive points from the feature,
  defining a characterization of negative points from the feature,
  constructing a refined characterization of positive points by combining characterizations of positive and negative points,
  using this refined characterization to modify the cost assignment function.

The technique is based on the definition of not only a "positive" but also a "negative" set of points. The positive set of points contains the points which are considered as being relevant to the boundary present on the image, meaning points that are on the drawn contour or in a near neighborhood, while the negative set of points contains points which are not considered as being relevant to the boundary. Because of the introduction of negative information, the obtained potential allows a more robust extraction of the path by minimization of the potential as zones that are characterized and taken into account by the method are larger.

In an advantageous embodiment, the comparison of the characterizations of positive and negative points for several potentials helps in adapting the weights of the individual potentials in a total function of potentials that has to be minimized so as to find the path.

BRIEF DESCRIPTION OF THE DRAWINGS

The invention will be described in detail hereafter with reference to the diagrammatic figures; therein.

DESCRIPTION OF EMBODIMENTS

Figure 1:
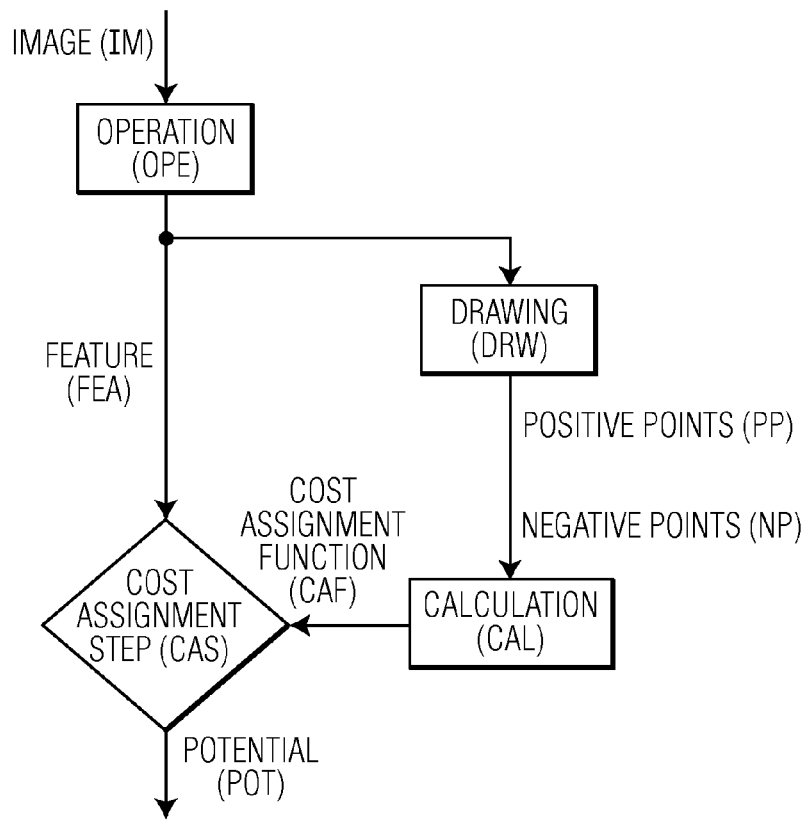
FIG. 1 is a block diagram of a segmentation method according to the invention.

Referring to FIG. 1, an image IM is characterized by at least a potential POT, said potential POT being obtained by applying a cost assignment function to a feature FEA in an assignment step CAS. The feature is intended to describe boundaries of the image and is directly obtained from a simple operation step OPE on the image. Such feature can be, for example, one of the following:

$P_G$: "gradient feature", i.e. gradient magnitude, $P_D$: "gradient direction feature", $P_L$: "laplacian feature", i.e. laplacian zero-crossing, $P_I$ (respectively $P_O$): "inside (respectively outside) intensity feature", i.e. pixel intensity beneath the boundary in the gradient direction (respectively opposite of the gradient-direction), $P_E$: "edge intensity feature", i.e. pixel intensity on the boundary.

More details concerning the features are available in W. A. Barrett and E. N. Mortensen, *Interactive Segmentation with Intelligent Scissors*, Graphical Models and Image Processing 60, pp 349-384, 1998.

The main problem of such a method of path extraction is that the potential used has to be relevant for the different boundaries of the image. If the potential, that is the feature transformed using a cost assignment function, is relevant, boundaries correspond to the minimum of the potential.

Consequently the potential can be adapted in order to be relevant for the image. This means that the cost assignment function has to be modified in order to emphasize the interesting part of each feature FEA.

For some features (pixel intensities for example) it is hard to decide without prior knowledge about the boundary to extract, which values are to be preferred. That is why a training method using a contour drawn in a drawing step DRW (for example, a contour drawn by a user) is useful. Individual potentials are constructed with a cost assignment function CAF applied to the feature FEA in a step of cost assignment CAS. Training is used to dynamically modify this cost assignment function CAF in a calculation step CAL that uses information available from the drawing step DRW. The training method results in a modification of the cost assignment function CAF and, consequently, in a modification of the potential POT.

The invention more specifically concerns this training aspect of the method and the use of information that is available after the drawing step DRW. The aim of training is to adapt, during the extraction of the path, the cost assignment function to the particularity of a drawn contour.

Figure 2:
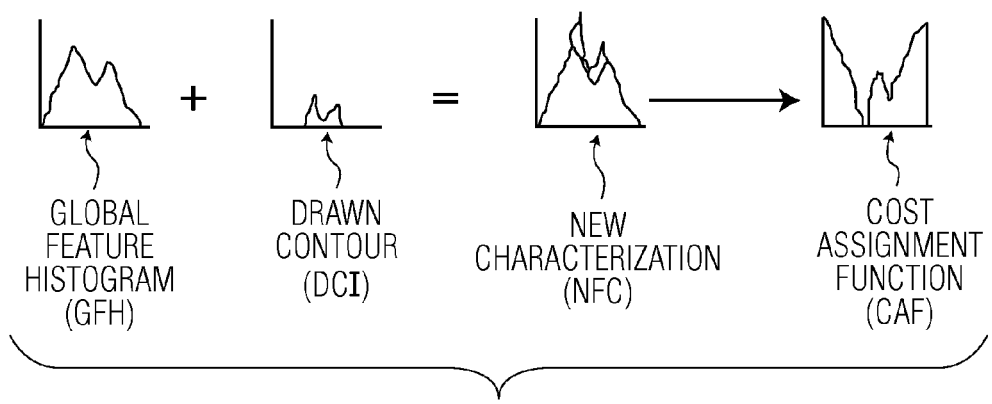
FIG. 2 illustrates the calculation step of a cost assignment function.

W. A. Barrett and E. N. Mortensen, *Interactive Segmentation with Intelligent Scissors*, Graphical Models and Image Processing 60, pp 349-384, 1998 introduced the following scheme: assuming that a drawn contour is valid or relevant for a boundary present on the image, the cost assignment function is modified in a calculation step that is illustrated on FIG. 2 in order to favor contours with the same aspect for each feature. In an advantageous embodiment said contour is drawn by a user as the user can define a first approach of a boundary by looking at an image. FIG. 2 shows an example of characterization of points in the form of a curve representing the distribution of points against a parameter of the feature (for example, the intensity). The cost assignment function is initialized. For example, the initial cost assignment function is the inverse of a global histogram of the feature GFH, said histogram reporting the characteristics of the feature: distribution of points against intensity for example. During the extraction, the initial characterization GFH is iteratively modified in a new characterization NFC by using information from the drawn contour DCI. The new cost assignment function CAF is then the inverse of the new characterization NFC.

In existing methods the training is limited to a portion of the path itself and only takes "positive" information into account. The invention proposes to define a positive and a negative training set of points.

Figure 3A:
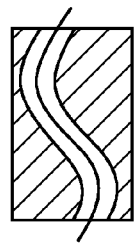
FIG. 3 illustrates several embodiments of the invention.

The positive training set is in the neighborhood of the drawn contour that is assumed to be relevant for a boundary present on the image, whereas the negative one is further away. In a first embodiment (see FIG. 3a), positive points are points that lie on the drawn contour and the ones that are less than a first distance away from the first contour, and negative points are the other points present in a rectangular area defined around the drawn contour. This embodiment takes many points into account and can, consequently, require a long calculation. It is also possible that another boundary is present in the rectangular area, implying mistakes in the extraction of the path.

Figure 3B:
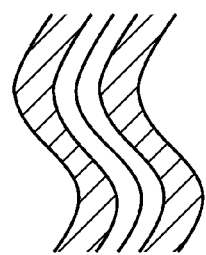

In another embodiment (see FIG. 3b), positive points are points that lie on the drawn contour and the ones that are less than a first distance away from the drawn contour, and negative points are the other points that are further away from the drawn contour than the first distance and closer thereto than a second distance. Both regions now follow the shape of the path as borders. This method also takes many points into account and, consequently, can also be time consuming.

Figure 3C:
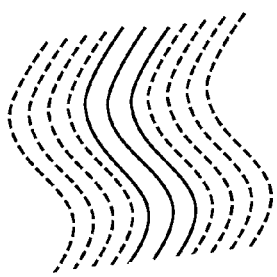
Figure 4A:
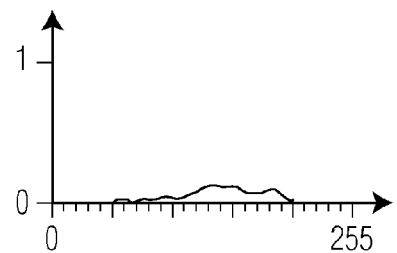
FIG. 4 illustrates the calculation step of a cost assignment function according to the invention.
Figure 4B:
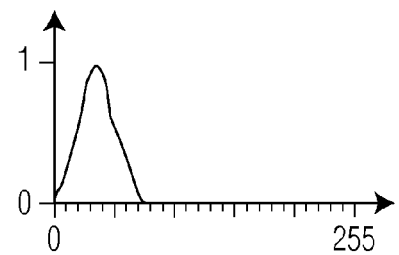
Figure 4C:
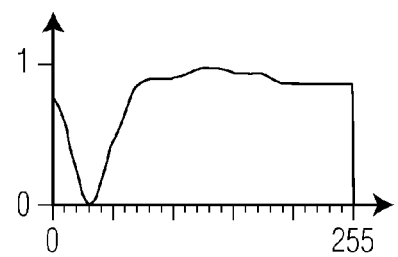
Figure 4D:
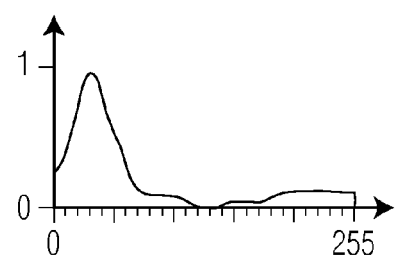

In a preferred embodiment (see FIG. 3c), the positive and the negative set of points are chosen as translations of the drawn contour DC parallel to this drawn contour DC. The positive set of points is the set of p nearest translations and the negative set of points is the set of n next translations. Points present on the different translated segments can be weighted according to their distance to the training path in the definition of the characterization. Using such a weighting, the resultant curve, representing the information from the drawn contour DC (for example, the curve DCI in FIG. 2), would take into account such a weighting as the nearest points of DC would have a stronger weight than others in the constitution of the curve. The negative/positive set of points can be symmetrical for the gradient magnitude and the edge intensity features as in FIG. 3c. However, in order to consider the non-symmetrical aspect of the "inside" and "outside" features, it is possible to adopt for them non-symmetrical training areas, depending on the direction of the gradient on the path, the path direction and the considered feature.

Referring to FIG. 1 for the embodiments presented in FIG. 3, the information from the drawn contour is two-fold according to the invention: PP corresponds to positive training set of points and NP to negative set of points.

Referring to FIG. 4, the positive/negative training sets of points are used to build two distinct training characterizations corresponding to positive (FIG. 4a) and to negative (FIG. 4b) points, respectively. A combination (FIG. 4c) of the positive (FIG. 4a) and the negative (FIG. 4b) characterizations is calculated and the cost assignment function (FIG. 4d) is the scaled inverse of this difference represented in FIG. 4c. Referring to FIG. 2, the information from the drawn contour DCI would be the algebraic difference between positive and negative set of points according to the invention. This difference defines a refined characterization of positive points. In comparison with FIG. 2, in FIG. 4 the cost assignment function is calculated with an initialization to zero and, consequently, not with a global histogram (or characterization) of the feature. Because of this initialization, it is not necessary to have any a priori knowledge of the cost assignment function.

The result of the method according to the invention is that, using such a refined characterization of positive points, feature values of the negative area are strongly penalized while gray levels of the positive area are favored.

In a preferred embodiment, several potentials corresponding to different features are used. A function of potentials is, consequently, defined and the path extraction becomes a minimization of the function of potentials. Indeed, the function of the potential is a complex potential.

Using such a function allows a greater adaptation of the function that has to be minimized to the image. Boundaries in this case are still defined as minima of the function of potentials.

Dijkstra and Cohen and Kimmel propose different algorithms to search such a path from a function of potentials (E. W. Dijkstra, A note on two problems in connection with graphs, Numerische Mathematic, pp 269-271, 1959 and L. Cohen and R. Kimmel, Global Minimum for Active Contour Models: a Minimal Path Approach, International Journal of Computer Vision, pp 57-78, 1997).

For example, the function of potentials is a weighted sum of six data-driven individual potentials. It is defined, on a directed graph-arc from a point p to an adjacent point q, as follows:

$P(p,q) = \omega_G P_G(q) + \omega_L P_L(q) + \omega_D P_D(p,q) + \omega_I P_I(q) + \omega_O P_O(q) + \omega_E P_E(q)$, where $P_G, P_L, P_D, P_I, P_O, P_E$ are the features as exposed above but transformed using a cost assignment function in order to have a potential and each $\omega$ to is the weight of the corresponding potential.

When such a function is defined, another advantage of the use of positive and negative training sets of points is that the evaluation of the differences between the characterizations of both sets of points for each individual potentials facilitates the adaptation of the weight of the corresponding individual potential in the global function of potentials. If the characterizations between positive and negative points are distinct enough for a given feature, as it is the case in FIG. 4, for example, it can be assumed that the considered feature is relevant for the boundary and its weight can be increased. It allows the discriminating features to be searched for a given image or a correct feature to be selected from a number of features (for instance selecting the adequate resolution for the contour of interest).

Consequently, the advantages of the use of these two positive and negative characterizations is two-fold: to build an adapted potential for each feature through the construction of an adapted cost assignment function and to adapt automatically the weight of the individual potential in a function of potentials as described below.

The introduction of a negative area yields not only better individual potentials but also automatic weighting of all these potentials into a global function of potentials.

This interactive segmentation tool enables to a non-specialist to segment quickly the contour of an anatomical object independently from any acquisition modality. Effectively one requirement of this segmentation is the drawing of a contour using a visual determination from the image. Then the robustness of the method allows that, when the user asks for a path between two points, the method to directly find the minimal potential path by minimization of the potential as generated by the invention. This segmentation can be applied in real-time by automatic adaptation of the cost assignment function after each drawing of a contour.

Figure 5:
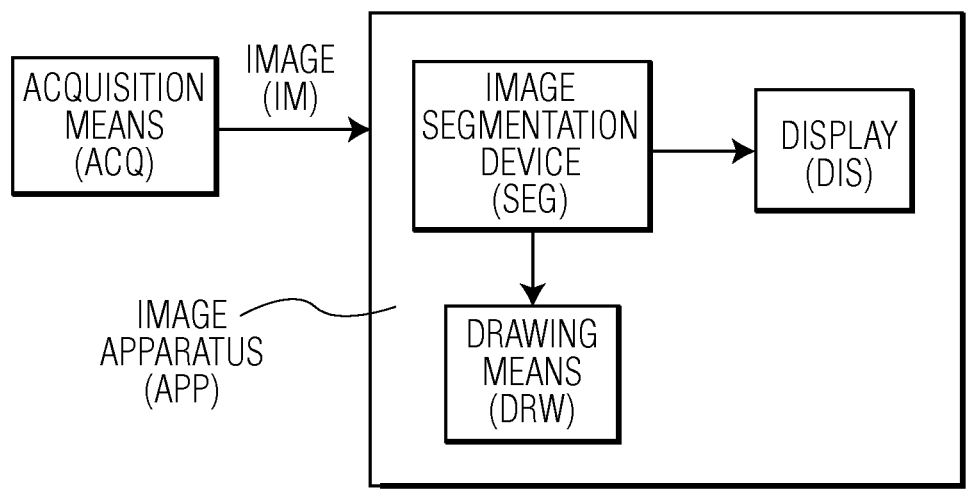
FIG. 5 is a block diagram of an imaging apparatus in which the invention is implemented.

Referring to FIG. 5, an imaging apparatus APP comprises an image segmentation device SEG to implement a method of segmentation as presented above, said imaging apparatus comprising display means DIS and drawing means to define a contour on an image IM. The segmentation device SEG and the display means receive an image IM from acquisition means ACQ that may be included or not in the imaging apparatus APP itself. The segmentation method can be suitably implemented in a programmed computer, or a special purpose processor having soft/hardware means that are arranged to perform the functions and calculations according to the invention.

In specific embodiments of such a segmentation device, interactivity has been introduced into the optimal path approach. The method offers to the user a large degree of control over the segmentation process. The idea is the following: a start point is selected by the user on the boundary to be extracted, and an optimal contour is computed and drawn in real time between this start point and the current cursor position. Thus, user control is applied also during the extraction. This interactivity allows a drawn contour to be generated. This implies that the apparatus according to the invention includes drawing means DRW that allow interactivity in real-time with the user. As the drawing of the user is not very accurate, an accurate training as provided by the invention is an essential feature.

The invention claimed is:

1. A method for segmenting an image by path extraction using minimization of at least a potential, said potential being calculated from a feature of the image using a cost assignment function by way of the following steps:
    initializing the cost assignment function;
    defining two groups of points in a neighborhood of a drawn contour: the ones that are considered to be relevant to a boundary, called positive points, and the ones that are not considered to be relevant to said boundary, called negative points;
    wherein positive points comprise points that lie on the drawn contour and points that are less than a first distance away from the drawn contour, and negative points comprise all other points present in a rectangular area defined around the drawn contour;
    defining a characterization of positive points from the feature,
    defining a characterization of negative points from the feature,
    constructing a refined characterization of positive points by combining characterizations of positive and negative points,
    using this refined characterization to modify the cost assignment function.

2. A method as claimed in claim 1, characterized in that the neighborhood of the drawn contour is chosen among the group comprising a rectangular area defined around the drawn contour, an area following the shape of the contour around this contour, several translated paths having a shape similar to the drawn contour and translated parallel to the drawn contour.

3. A method as claimed in claim 1, wherein the characterization of negative and/or positive points is defined using a weighting of said points according to their distance to the drawn contour.

4. A method as claimed in claim 1, comprising the steps of:
    constructing a function of potentials by summing and weighting several potentials corresponding to several features, said weights being calculated using the characterizations of positive and negative points present on the different features,
    minimizing the function of potentials so as to find the path.

5. An imaging apparatus comprising:
    image display means,
    drawing means allowing a drawn contour to be defined on an image,
    segmenting means for implementing the method for segmenting an image as claimed in claim 1.

6. An imaging apparatus as claimed in claim 5, characterized in that drawing means enable the drawn contour to be drawn by a user.

* * * * *